United States Patent [19]
Pradt et al.

[11] 3,977,966
[45] *Aug. 31, 1976

[54] PURIFICATION OF NON-BIODEGRADABLE INDUSTRIAL WASTEWATERS

[75] Inventors: Louis A. Pradt, Wausau; John A. Meidl, Schofield, both of Wis.

[73] Assignee: Sterling Drug Inc., New York, N.Y.

[ * ] Notice: The portion of the term of this patent subsequent to Apr. 9, 1992, has been disclaimed.

[22] Filed: Sept. 24, 1975

[21] Appl. No.: 616,496

[52] U.S. Cl. .................................. 210/17; 210/18; 210/63 R; 210/71
[51] Int. Cl.² ...................... C02B 1/34; C02C 5/04
[58] Field of Search .................. 210/17, 18, 33, 40, 210/63, 67, 71

[56] References Cited
UNITED STATES PATENTS

| | | | |
|---|---|---|---|
| 3,442,798 | 5/1969 | Schoeffel et al. | 210/40 |
| 3,824,186 | 7/1974 | Erickson et al. | 210/10 |
| 3,876,536 | 4/1975 | Pradt et al. | 210/18 |

Primary Examiner—Thomas G. Wyse
Attorney, Agent, or Firm—Thomas L. Johnson; B. Woodrow Wyatt

[57] ABSTRACT

A process of treating non-biodegradable industrial wastes by wet oxidation, followed by biological oxidation of the liquid phase by aeration in the presence of biomass and powdered activated carbon, and wet oxidation of the spent carbon and excess biomass to regenerate the activated carbon.

3 Claims, 2 Drawing Figures

PURIFICATION OF NON-BIODEGRADABLE INDUSTRIAL WASTEWATERS

BACKGROUND OF THE INVENTION

1. Field of the Invention

This invention relates to a process of purification of non-biodegradable industrial wastewaters.

2. Description of the Prior Art

One of the most economical and commonly employed methods of wastewater treatment involves the use of microorganisms to consume the contaminants in the wastewater. However, there are many industrial processes which produce wastes of such obnoxious and toxic character that organisms cannot exist therein and biological treatment therefore becomes impractical. Furthermore, the increasing cost of fuel and the enforcement of stricter air pollution standards have made incineration of such wastes uneconomical or impractical. Since viable surface treatment alternatives do not exist these effluents are frequently dumped at sea or are disposed of by injection into deep wells.

The wet oxidation process (oxidation in the presence of water at elevated temperature and pressure) has been known for about a quarter of a century as a useful method of disposal of a wide variety of waste substances and in purification of wastewaters containing pollutants; cf. Zimmermann U.S. Pat. Nos. 2,665,249, 2,824,058 and 2,903,425.

The term "wet oxidation" is intended to apply to any oxidation effected in an aqueous medium at elevated temperature and pressure with any gas containing oxygen. While ordinary air is the most readily available source of an oxygen containing gas, any other gas mixture containing oxygen as well as pure oxygen may be used.

Pradt U.S. Pat. No. 3,876,536 describes a process for treating sewage sludge or night soil by wet oxidation followed by biological oxidation by aeration in the presence of biomass and powdered activated carbon and regeneration of the carbon by wet oxidation. There is no disclosure of application of the process to non-biodegradable industrial wastes.

SUMMARY OF THE INVENTION

The invention relates to a process for treating nonbiodegradable industrial wastewaters which comprises subjecting said wastewaters to wet oxidation at a temperature between 150° and 375°C. and a pressure between 150 and 4000 psig so that a reduction of between 30 and 99 percent in chemical oxygen demand is obtained, separating the gaseous, liquid and solid phases from said oxidation, biologically oxidizing the liquid phase in an aeration contact tank containing a biomass suitable to effect biological oxidation of the organic solutes present in said liquid phase while maintaining powdered activated carbon in the aeration contact tank in an amount sufficient to enhance the bio-oxidation and substantially reduce the odor and color of said liquid phase, carrying out the biological oxidation until excess biomass builds up and the activated carbon becomes spent, transferring a mixture of the excess biomass and spent carbon to a wet oxidation reactor, and oxidizing said mixture under conditions similar to those used for the wet oxidation of the non-biodegradable industrial wastewater so as to regenerate the powdered activated carbon for further use in the biological oxidation step and at the same time disposing of the excess biomass.

DETAILED DESCRIPTION INCLUSIVE OF PREFERRED EMBODIMENTS

Many industrial wastewaters, such as those from the plastics, rubber, pesticide and pharmaceutical industries contain substances which are toxic to or relatively impervious to the action of aerobic organisms ordinarily effective in biological oxidative degradation of organic compounds. These substances, termed non-biodegradable, include halogenated hydrocarbons such as ethylene dichloride, chlordane, DDT, and the like; and wastes from the manufacture of acrylonitrile, monosodium glutamate, polysulfide based rubbers, metallurgical coke, petrochemicals and pharmaceuticals.

A unique feature of the wet oxidation is that complex organic molecules are broken into simpler, lower molecular weight molecules prior to complete oxidation to the ultimate products, carbon dioxide and water. The proportion of partially oxidized materials can be regulated by the reaction time and temperature. These principles can be utilized for non-biodegradable wastewater treatment in that the non-biodegradable components are converted to less complex molecules, and the wastewater is thereby rendered amenable to biological treatment. For instance, a wastewater containing 1,1-bis(p-chlorophenyl)-2,2,2-trichloroethane (DDT), which would be regarded as toxic or very difficult to treat at anything but very dilute levels in a biological system was reduced to 1% of its initial concentration after an 80% wet air oxidation (chemical oxygen demand reduction as used herein) and to less than 0.1% after a 90% wet oxidation.

There are basic reasons why treatment of a wastewater is not usually effected totally by wet oxidation alone. The capital cost of a wet oxidation facility increases rapidly as the degree of oxidation gets closer to 100%. Even the effluent after a 99% wet oxidation of a concentrated raw waste will seldom be of acceptable quality. The wastewater is however quite amenable to biological treatment even after a considerably less severe wet oxidation, as little as 30% reduction in chemical oxygen demand.

Accordingly, the wet oxidation is supplemented by a biological oxidation step which serves to remove substantially all of the remaining chemical oxygen demand of the wastewater. The addition of powdered activated carbon to the biological oxidation step serves to adsorb any non-biodegradable materials which had survived the wet oxidation and to improve the removal of chemical oxygen demand (COD) and biochemical oxygen demand (BOD) from the wastewater. Furthermore, the addition of activated powdered carbon improves the stability of operation of the biological system and provides an aeration system which requires less dilution with water.

Figure 1:
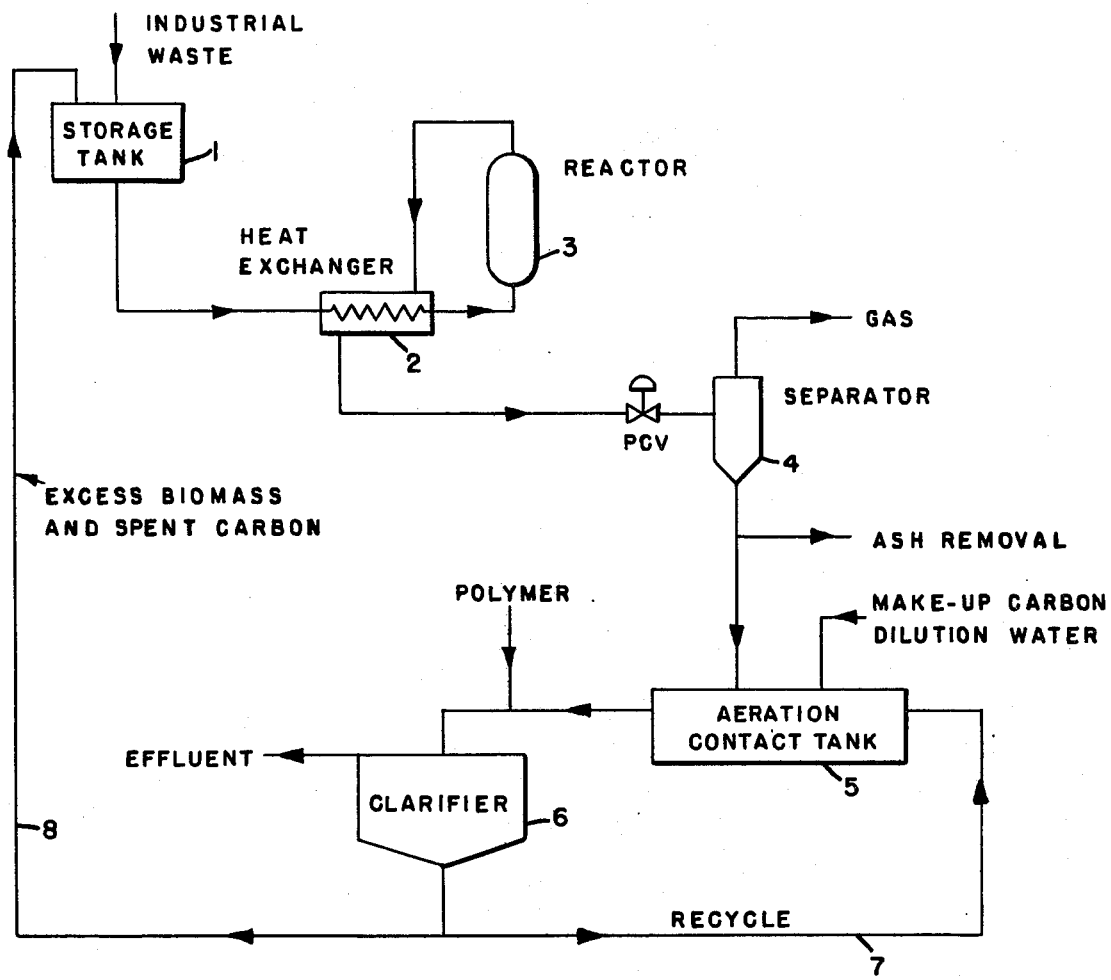
FIG. 1 represents one embodiment of the invention.

The operation of the new invention is carried out as follows with reference to the drawings. In the system set forth in FIG. 1, the industrial wastewater is supplied to a storage tank 1 whence it is transported in admixture with air through a heat exchanger 2 to a reactor 3 where the wastewater is subjected to wet oxidation.

The wet oxidation takes place between a temperature of 150° and 375°C. and at a pressure sufficient to maintain most of the water present in the liquid phase, i.e. between 150 and 4000 psig. The extent of oxidation preferably ranges between 30 and 90 percent reduction in COD. The reactor contents after oxidation are returned through the heat exchanger 2 and then passed to a separator 4 where the gas and liquid phases are separated. The liquid phase contains suspended solids such as sand, described as "ash". The ash is removed by settling and decanting the liquid, or by filtration, and the liquid sent on to an aeration contact tank 5 containing a biogrowth or biomass suitable to effect biological oxidation of the organic solutes present in the waste liquor. Powdered activated carbon in aqueous slurry is maintained in the aeration tank to the extent that the concentration of carbon is at least 500 parts per million and preferably in the range of 5000 to 20,000 parts per million by weight. After a period of 2–400 hours of aeration contacting, the liquid and biomass-carbon pass to a clarifier 6 where the mixture of powdered activated carbon and biomass settles to the bottom of the clarifier. A flocculating agent, preferably a cationic organic polymer may be added between the aeration tank and the final clarifier to enhance the settling characteristics of the stream. The biomass-carbon mixture collected in the clarifier is recycled back to the aeration tank 5 via the recycle line 7.

The addition of the powdered activated carbon to the aeration vessel enhances the bio-oxidation taking place there and substantially reduces the odor and color of the waste liquors.

During operation of the process, excess biomass builds up in the system and the carbon becomes spent after its capacity for adsorption of influent COD-BOD has been reached. A further aspect of this invention resides in the concept of removing excess biomass and spent carbon from the clarifier 6 and transporting it through the excess biomass-carbon line 8 to the storage tank 1 where it is mixed with fresh industrial wastewater and transported therewith to the wet oxidation reactor. In this way the excess biomass is disposed of by oxidation and the spent carbon is regenerated. In this system where the carbon is recycled and regenerated, the liquid phase in separator 4 will contain a suspension of regenerated carbon and ash. The ash is preferably removed before the liquor containing the regenerated carbon is returned to the aeration tank. The ash removal can be accomplished by a centrifugal device which makes use of the difference in specific gravity between the ash and the regenerated carbon. If the amount of carbon added to the system is small, the carbon in the excess biomass can be oxidized completely or removed with the ash. Fresh, virgin carbon is added to make up the original weight as needed.

Figure 2:
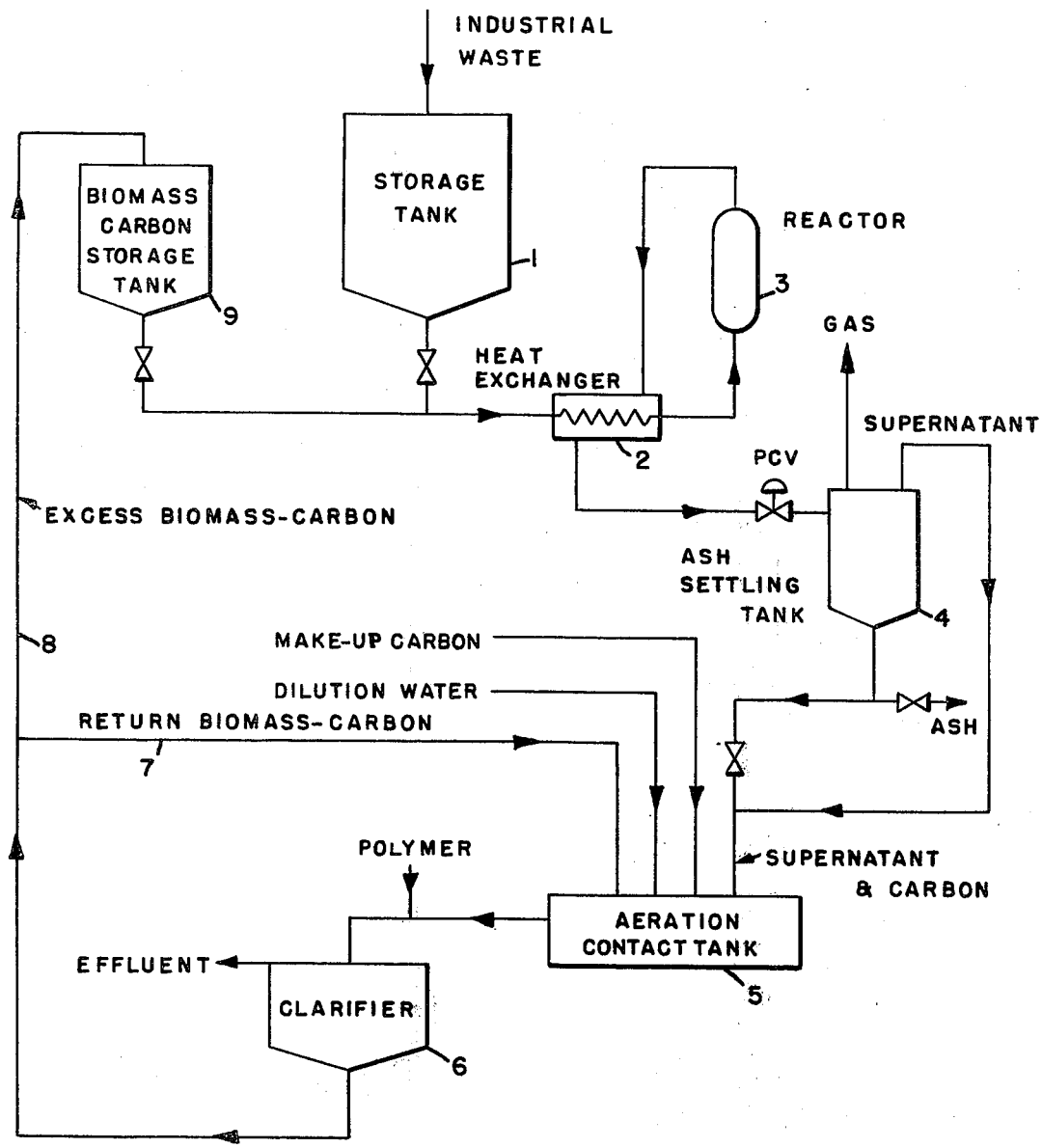
FIG. 2 represents a further embodiment of the invention.

A still further aspect of this invention resides in the concept of treating the mixture of spent carbon and excess biomass from the biological oxidation step separately from the industrial wastewater. Referring to FIG. 2, excess biomass and spent carbon collected in clarifier 6 is transported via line 8 to a biomass-carbon storage tank 9. In this way it is possible to submit separately or intermittently to wet oxidation the industrial wastewater on the one hand, and the excess biomass-spent carbon mixture independently on the other. There are two outlets provided in the ash settling tank (separator 4). One outlet is for ash disposal and the other leads to the aeration tank 5. The ash disposal outlet is used when industrial wastewater is being subjected to wet oxidation. The outlet to the aeration tank is used when the reactor 3 is processing excess biomass and spent carbon since little or no ash is produced. The use of the same equipment for wet oxidation of the two streams on an alternating schedule can result in substantial economic savings on the initial cost of the waste treatment system.

The following examples will illustrate the invention without the latter being limited thereby.

EXAMPLE 1

The wastewater from a particular herbicide and pesticide manufacturing complex contained quantities of the manufactured products as well as chemically related compounds. Attempts at biological treatment were futile. Partial wet oxidation was tried to determine if the wastewater could be rendered treatable. Weekly composite samples of the wastewater were taken over a period of several months. These samples were wet oxidized for a period of 60 minutes at an oxidation temperature of 290°C. and an oxygen partial pressure of about 660 psi. The partially oxidized samples were then used as feed to an aerated and stirred biological reactor which contained an acclimated sludge. COD and $BOD_5$ (BOD in five days at 20°C.) were used to measure the degree of treatment after each step. The ratio of $BOD_5$ to COD was used to indicate the biotreatability of the detoxicated wastewater after wet oxidation with air.

The following table details the averaged results of the composite study.

|  | Raw Waste | After Wet Oxidation | After Biological Treatment |
|---|---|---|---|
| COD, mg/l | 71,000 | 10,650 | 570 |
| % COD reduction | — | 85 | 94.6 |
| $BOD_5$, mg/l | 16,330 | 9,159 | <50 |
| %$BOD_5$ reduction | — | 43.9 | 99.4+ |
| $BOD_5$/COD | .23 | .86 | — |

The addition of about 10,000 parts per million by weight of powdered activated carbon to the biological reactor further reduces the COD and BOD of the final effluent and results in improved color and odor characteristics.

EXAMPLE 2

The wastewaters that issue from a facility manufacturing vinyl cyanide (acrylonitrile) typically contain 1000–5000 mg/l of total cyanide in the form of dissolved hydrogen cyanide, vinyl cyanide, and polymeric organic nitriles. Such high levels of these components precludes treatment by biological means. The wastes are usually disposed of by dumping at sea, deep well injection, or incineration.

A sample of this waste was subjected to catalytically assisted wet oxidation at 270°C. and an average oxygen partial pressure of about 200 psi. The oxidized samples were used as feed for the biological treatment in the same manner as described in Example 1.

The results of this two step treatment are shown in the following table.

|  | Raw Waste | After Wet Oxidation | After Biological Treatment |
|---|---|---|---|
| COD, mg/l | 42,000 | 920 | 276 |
| % COD reduction | — | 97.8 | 70 |
| $BOD_5$ | * | 720 | 10–20 |

|  | Raw Waste | After Wet Oxidation | After Biological Treatment |
|---|---|---|---|
| % BOD$_5$ reduction | — | — | 90–95 |
| Total Cyanide mg/l | 1,900 | 1 | 0.4 |
| % Total Cyanide Reduction | — | 99.9+ | 99.9++ |

*BOD$_5$ only measurable at high dilution.

The addition of about 10,000 parts per million of powdered activated carbon to the biological oxidation reactor further reduces the COD and BOD of the final effluent and results in improved color and odor characteristics.

EXAMPLE 3

The wastewater from a chemical intermediates manufacturing complex was untreatable by conventional biological means. Biological oxidation in the presence of powdered activated carbon gave only marginally acceptable results.

A partial wet oxidation of the raw waste at 280°C. and average oxygen partial pressure of about 200 psi rendered the waste treatable by biological means. The wet oxidized effluent was subjected to biological oxidation in the presence of biomass and 10,000 ppm of powdered activated carbon with a contact period of 120 hours. The results of this work are shown in the following table.

|  | Raw Waste | After Wet Oxidation | After Combined Biological Physical Adsorption |
|---|---|---|---|
| COD, mg/l | 55,000 | 14,000 | 300 |
| % COD reduction | — | 74.5 | 97.8 |
| BOD$_5$, mg/l | 23,000 | 8,400 | 30 |
| % BOD$_5$ reduction | — | 63.5 | 99.6 |
| BOD$_5$/COD | .46 | .70 | — |

We claim:

1. A process for treating non-biodegradable industrial wastewaters which comprises subjecting said wastewaters to wet oxidation at a temperature between 150° and 375°C. and a pressure between 150 and 4000 psig so that a reduction of between 30 and 99 percent in chemical oxygen demand is obtained, separating the gaseous, liquid and solid phases from said oxidation, biologically oxidizing the liquid phase in an aeration contact tank containing a biomass suitable to effect biological oxidation of the organic solutes present in said liquid phase while maintaining powdered activated carbon in the aeration contact tank in an amount sufficient to enhance the bio-oxidation and substantially reduce the odor and color of said liquid phase, carrying out the biological oxidation until excess biomass builds up and the activated carbon becomes spent, transferring a mixture of the excess biomass and spent carbon to a wet oxidation reactor, and oxidizing said mixture under conditions similar to those used for the wet oxidation of the non-biodegradable industrial wastewater so as to regenerate the powdered activated carbon for further use in the biological oxidation step and at the same time disposing of the excess biomass.

2. The process according to claim 1 in which the amount of powdered activated carbon present in the biological step is between 500 and 20,000 parts per million.

3. The process according to claim 1 in which the oxidation of the spent carbon and excess biomass is carried out in admixture with additional non-biodegradable industrial wastewater.

* * * * *

UNITED STATES PATENT AND TRADEMARK OFFICE
CERTIFICATE OF CORRECTION

PATENT NO. : 3,977,966
DATED : August 31, 1976
INVENTOR(S) : Louis A. Pradt and John A. Meidl It is certified that error appears in the above-identified patent and that said Letters Patent are hereby corrected as shown below:

Cover page, second line of [*] Notice, "Apr. 9, 1992" should read --Apr. 8, 1992--.

Signed and Sealed this

Ninth Day of November 1976

[SEAL]

Attest:

RUTH C. MASON
*Attesting Officer*

C. MARSHALL DANN
*Commissioner of Patents and Trademarks*